March 26, 1968
B. E. PITCHES
3,375,510
MEANS FOR INDICATING THE PASSAGE OF
A FAULT CURRENT ALONG A CONDUCTOR
Filed Dec. 29, 1964
3 Sheets-Sheet 1
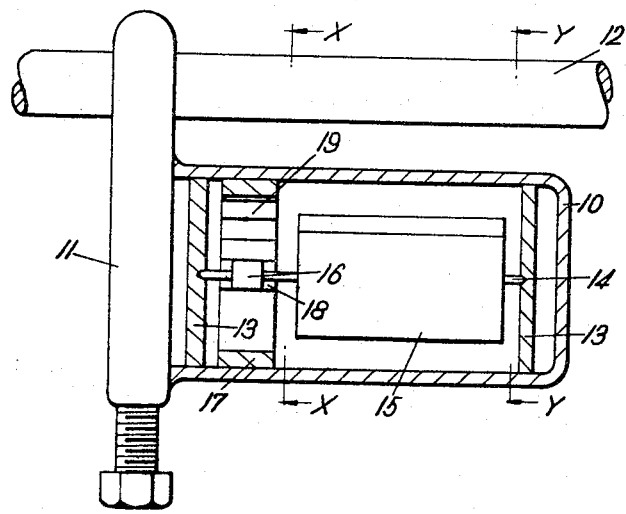
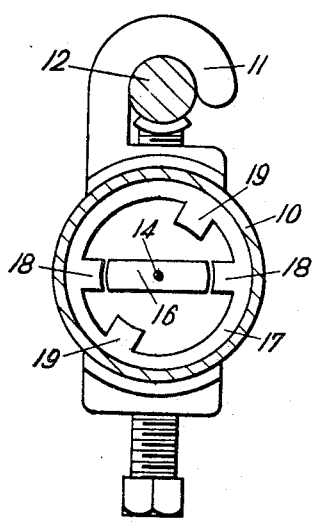
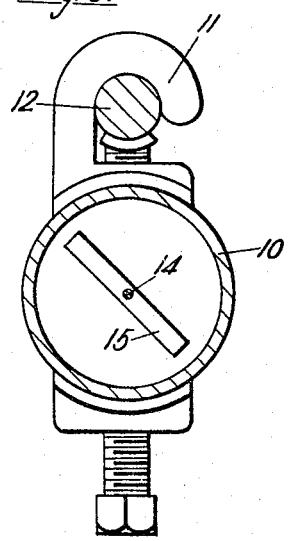
Inventor
B. E. PITCHES
By
Cameron, Kerkam & Sutton
Attorneys

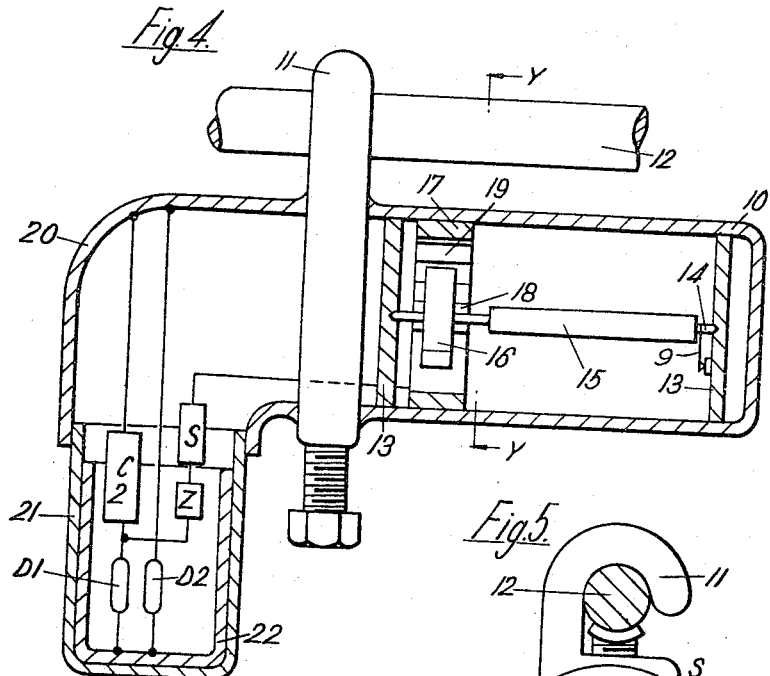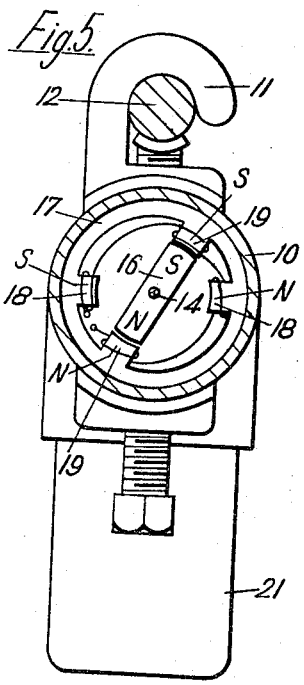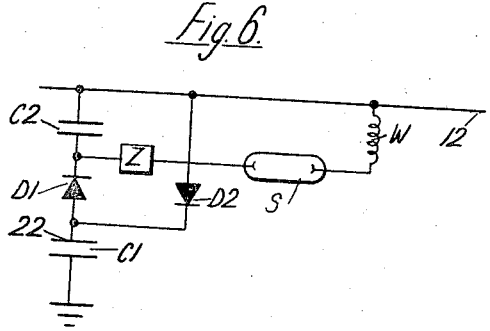

March 26, 1968
B. E. PITCHES
3,375,510
MEANS FOR INDICATING THE PASSAGE OF
A FAULT CURRENT ALONG A CONDUCTOR
Filed Dec. 29, 1964
3 Sheets-Sheet 3
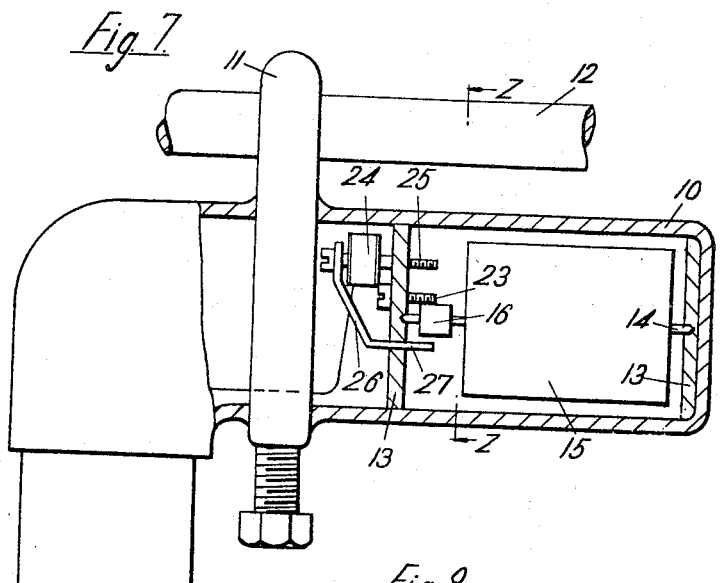
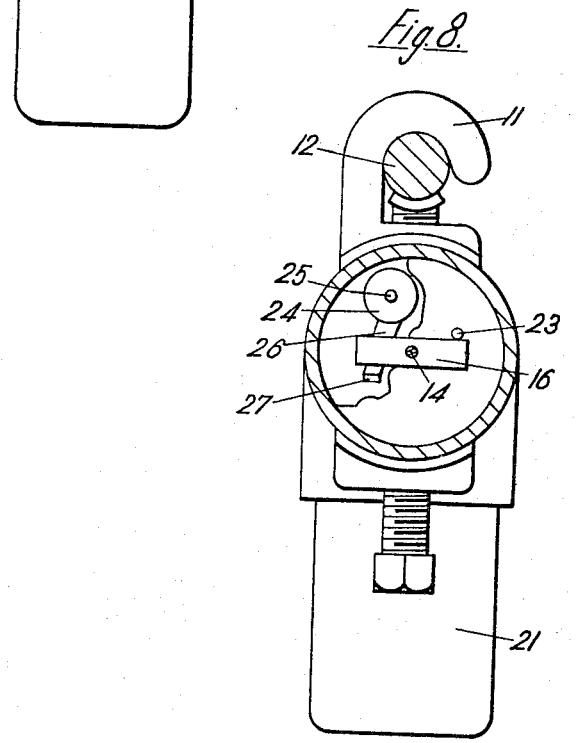
Inventor
B. E. PITCHES
By
Cameron, Kerkam & Sutton
Attorneys

United States Patent Office 3,375,510
Patented Mar. 26, 1968

3,375,510
MEANS FOR INDICATING THE PASSAGE OF A FAULT CURRENT ALONG A CONDUCTOR
Brian Edward Pitches, Balerno, Midlothian, Scotland, assignor to Ferranti, Limited, Lancashire, England, a company of Great Britain and Northern Ireland
Filed Dec. 29, 1964, Ser. No. 421,944
Claims priority, application Great Britain, Jan. 10, 1964, 1,144/64
12 Claims. (Cl. 340—253)

ABSTRACT OF THE DISCLOSURE

A fault indicating apparatus is adapted to be mounted to a conductor of an electric power line such that a vane of magnetic material secured to a rotatable spindle responds to the magnetic lines of force of the current passing through the conductor. The vane is initially constrained in a position which is not tangential to the magnetic lines of force passing through the pivotal axis of the vane when a normal electric current passes along the conductor. In the presence of a fault current, the vane is rotated to a position which is substantially tangential to the magnetic lines of force of the current.

This invention relates to means for indicating the passage of a fault current along a conductor of an electric power line. It is particularly, though not exclusively, suitable for use on the overhead branch lines making up a transmission or distribution network.

In this specification the term "fault current" is used to indicate a current of excessive magnitude such as that resulting from an overload or from a short-circuit or earth fault.

The invention is primarily intended to be used as an aid in the location of an overload fault in a system. Various methods of fault location are known, for example the method which involves passing RF pulses along a line in order to receive an echo from the fault. Such a method is not suitable for use in branched networks since echoes tend to be reflected also from junction points. Also if a fault echo is received there is no indication as to which branch it has come from.

The object of the invention is to simplify location of a fault by indicating the lines along which the fault current has passed.

According to the invention there is provided means for indicating the passage of a fault current along a conductor of an electric power line, which includes a vane of magnetic material secured to a rotatable spindle and capable of movement from one to another of two or more positions, means for constraining said vane in each of said positions, a housing arranged to contain said rotatable spindle and said constraining means, means for clamping said housing to said conductor such that one only of said positions of said spindle is substantially tangential to the magnetic field produced around said conductor by the passage of an electric current along it, whereby in the presence of a fault current said vane is rotated from a non-tangential one of said positions to said tangential position.

According to a preferred form of the invention means for indicating the passage of a fault current along a conductor as described above includes means for resetting said vane from said tangential position to a non-tangential position.

The invention will now be described with reference to the accompanying drawings, in which:

FIGURE 1 is a part-sectional end elevation of one embodiment of the invention;

FIGURE 2 is a sectional end elevation taken along the line X—X of FIGURE 1;

FIGURE 3 is a sectional end elevation taken along the line Y—Y of FIGURE 1;

FIGURE 4 is a part-schematic side elevation of a second embodiment of the invention;

FIGURE 5 is a sectional end elevation taken along the line Y—Y of FIGURE 4;

FIGURE 6 is a diagram of the electrical circuitry of FIGURE 5;

FIGURE 7 is a part-sectional end elevation of a third embodiment of the invention; and FIGURE 8 is a sectional end elevation taken along the line Z—Z of FIGURE 7.

Referring now to FIGURES 1, 2 and 3 a cylindrical housing 10, preferably of a transparent material, is fastened by means of a clamp 11 to a conductor 12 of an overhead line. Mounted inside the housing 10 in a pair of bearings 13, shown in simplified form, is a spindle 14. Carried on the spindle so as to rotate with it is a vane 15 of low hysteresis coefficient magnetic material. Also carried on the spindle 14 so as to rotate with it is a bar-shaped ceramic permanent magnet 16. Fastened to the housing 10 and surrounding the permanent magnet 16 is a closed iron circuit 17 having two pairs of pole-pieces 18 and 19. One of these pairs of pole-pieces 18 is located so that the line joining them is substantially tangential to the electric field surrounding the conductor 12 when an electric current flows along it.

FIGURES 2 and 3 are respectively sectional views showing the arrangement of the permanent magnet 16 and iron circuit 17, and the vane 15.

The device operates as follows. When the housing is clamped to a conductor with the magnet and vane system aligned as shown in FIGURES 2 and 3, the spindle 14 is constrained in this position due to the magnetic flux from the permanent magnet flowing around the iron circuit 17 by way of the pole-pieces 18. Normal current flowing in the conductor 12 will produce a magnetic field around the conductor which will cause a torque to be applied to the vane 15. However, the torque due to normal line currents in the conductor is not sufficient to break the attractive force between the permanent magnet 16 and the pole-pieces 18. Thus the spindle will not be rotated.

If now a fault current flows in the conductor 12, the resultant magnetic field will be greatly increased and hence so will the torque applied to the spindle 14. The spindle will now rotate in an anti-clockwise direction, as viewed in FIG. 3, until the vane lies in the direction of the magnetic field that is substantially tangential to the field surrounding the conductor 12 i.e. the vane is positioned perpendicular to an imaginary plane passing through the axis of the conductor and the spindle. In this position the poles of the permanent magnet are again adjacent to a pair of pole-pieces 19 in the iron circuit 17. Thus when the fault current ceases, probably due to the operation of protective apparatus, the spindle will be constrained in its new position.

The simplest form of indication is obtained by direct viewing of the vane 15 to see which position it is in. For this reason the vane should preferably be brightly colored, and the housing 10 will, of course, be transparent. The vane 15 may be part of, or coupled to, a cylinder with brightly colored segments to make it more easily visible. For example the vane may be embedded in a cylinder of plastic foam having its surface marked with fluorescent paint. However there are many other ways of giving the required indication either visually or by means of apparatus controlled by electrical contacts 9 operated by the movement of the spindle. Such apparatus is not, however, the subject of the present invention.

It is necessary to reset the device to its normal position when the fault condition is rectified. In some cases it may be possible to do this manually, for example by means of a permanent magnet carried on a pole and used to move the permanent magnet carried in the device. However such means may not always be convenient, and some form of automatic resetting is desirable.

FIGURES 4, 5 and 6 illustrate one form of the device described above which includes an automatic resetting circuit. The same reference numbers are used where appropriate.

In this embodiment the housing 10 is extended on the other side of the clamp 11 as shown, the extension 20, and the clamp, being of an electrically conducting material. A container of electrically insulated material 21 is fastened to the end of the extended housing. The container 21 has a conductive coating 22 on its inner surface, insulated from the extension 20 by the material of the container. Carried inside the container are several electrical components connected as shown in FIGURE 6. The conductive coating 22 forms one plate of a capacitor C1, the other plate of which is the ground. The coating 22 is connected through a diode D1 and a second capacitor C2 to the conductor 12. A second diode D2 is connected directly between the 20 and the coating 22. From the junction between capacitor C2 and diode D1 a connection is taken through a damping impedance Z to a two-terminal switching device S, of the type operable to close when the voltage between its two terminals exceeds a predetermined value. The other end of switching device S is connected through a winding W on the iron circuit pole pieces to the conductor 12 via the housing. In its simplest form the damping impedance Z may be a resistance, though an inductance may be used.

FIGURE 5 shows the arrangement of the winding W on the four pole-pieces 18, 19. Four coils, one on each pole-piece, are connected in series to form the winding W. When energised the two pole-pieces 18 take up opposite polarities so related to the position of the permanent magnet 16 as to attract the latter, the two pole-pieces 19 take up opposite polarities such as to repel the permanent magnet 16. Suitable polarities are shown on FIGURE 5 where the magnet is shown in the fault position in alignment with pole-pieces 19.

The operation of the resetting circuit is as follows. With the diodes D1 and D2 poled as shown in FIGURE 6, the capacitor C1, which has a very low value of the order of a few pico-farads, is charged through diode D2 to the full line voltage during each positive half-cycle; during each negative half-cycle diode D1 conducts and the charge on capacitor C1 is shared with capacitor C2, which has a relatively high value. This charging action is repeated until the voltage across capacitor C2 reaches the striking potential of the switching element S, when the capacitor C2 discharges through the winding W, thus resetting the spindle to its normal position. The damping impedance Z prevents the build-up of oscillations due to the parallel connection of capacitor C2 and winding W.

The charging and discharging action takes place repetitively, so long as line current is flowing. The time taken for the device to be reset depends on several factors, the value of capacitors C1 and C2, the line voltage, and the striking potential of the switching device S. It is convenient to arrange the values of the components so that the cycle takes, say ten minutes or so.

The switching device S may be a gas-filled discharge tube or a semiconductor device.

It will be apparent from the above description that the vane will move from its normal position to the fault-indicating position by the shortest route, and thus if normally aligned radially with respect to the field surrounding the conductor it might rotate in either direction.

FGURES 7 and 8 illustrate a further embodiment of the invention having a different resetting arrangement to that just described. The resetting circuit is, however, the same as that shown in FIGURE 6. Where appropriate the same reference numerals are used. Only that part of the housing 10 containing the rotatable spindle 14 and the vane 15 and permanent magnet 16 is shown in FIGURE 7, and part of one bearing-plate 13 has been cut away. The spindle is shown in its unoperated position with the magnet 16 substantially horizontal. A stop 23 of non-magnetic material limits the anti-clockwise rotation of the magnet 16 as shown in FIGURE 8.

The resetting winding W comprises a single coil 24 carried on a bobbin and fastened to one bearing plate 13 by a core bolt 25. This bolt projects through the bearing plate 13 and acts as a stop to limit the clockwise rotation of the magnet 16. One pole of the electromagnet formed by the coil 24 is the bolt 25, and the other is formed by a strip 26 of magnetic material which projects through the bearing-plate 13 and has its end 27 bent so as to be adjacent to the magnet 16 when the latter is in its unoperated position. Preferably the projecting end of the bolt 25 is covered with a sleeve of non-magnetic material. The strip 26 may be pivoted about the bolt 25 so as to change the position of the end 27.

The operation of the resetting arrangement just described is as follows:

Movement of the vane 15, and magnet 16, from the unoperated to the operated position takes place as before, movement being limited by the magnet 16 striking the bolt 25. When current is restored after the fault the capacitor C2 charges up as before, and the switch S operates when the potential across C2 reaches the appropriate value. Current flows through the coil 24, producing opposite magnetic poles at the bolt 25 and at the extremity 27 of the strip 26. The polarity of these are arranged so that the bolt 25 is of opposite polarity to the adjacent end of the magnet 16. Thus the magnet is repelled from the bolt 25 and simultaneously attracted towards the end 27 of the strip 26. Movement of the magnet, and hence of the spindle 14 and vane 15 is limited by the stop 23.

Indication of the passage of a fault current may be given by any of the methods mentioned above in relation to the first embodiment.

The device is used for fault location by placing one device on each junction of a network. By the "remote" side is meant that side furthest from the generator. It is then possible to determine the lines along which a fault current has flowed by examination of the devices.

The force acting on the vane 15 may be modified by placing suitably shaped pieces of, say, soft iron near to the vane to modify the magnetic field.

In the embodiments described above the spindle 14 is constrained in the operated position by the attraction between one or both poles of the permanent magnet 16 and an adjacent member of magnetic material. However it is possible to provide mechanical means for constraining the spindle in the operated or unoperated position if required.

The resetting means described above is only one suitable form. One alternative arrangement is to derive the energy for energising the electromagnet coil from a transformer of which the conductor 12 forms the primary winding. Another arrangement uses a secondary battery automatically charged from the power line of which the conductor forms part.

The permanent magnet 16 is preferably of the ceramic type since it is always situated in an alternating magnetic field which would rapidly tend to weaken other types of magnet. The magnet need not be bar-shaped if other shapes are preferred. Similarly the magnet need not be tangential to the field produced by the conductor 12, when in its unoperated position.

The physical arrangement of the component parts of the fault indicator need not be as illustrated in the drawings, which are intended only as examples of possible arrangements.

What we claim is:

1. Means for indicating passage of a fault current along a conductor of an electric power line comprising a housing, a spindle rotatably supported within said housing, a vane of magnetic material secured to said spindle and rotatable therewith from a normal line current indicating position to a fault current indicating position, magnetic means for constraining said vane in each of said positions, and means for clamping said housing to the conductor at a selected position relative to said conductor such that the axis of said spindle is parallel to the axis of said conductor and said vane is constrained in the absence of a fault current in the line conductor in said normal line current indicating position, said vane being responsive to a fault current along the conductor to overcome the force of the magnetic constraining means so as to rotate from the normal line current indicating position to the fault current indicating position, such that said vane is positioned perpendicular to an imaginary plane passing through the axis of the conductor and the axis of the spindle.

2. Means as claimed in claim 1 in which said magnetic constraining means comprises a permanent magnet rigidly secured to said spindle and rotatable therewith, and a magnetic circuit including a closed core rigidly supported to the housing and surrounding said permanent magnet and having at least one pole piece adjacent to said permanent magnet in each of said positions of said vane.

3. Means as claimed in claim 2 further including means for resetting said vane from its fault current indicating position to its normal line current indicating position.

4. Means as claimed in claim 3 in which the resetting means include an electromagnet coil operably associated with said magnetic circuit and adapted to be energized to cause said permanent magnet to be rotated from the fault current indicating position to the normal line current indicating position, and electrical circuit means including the conductor of the power line for energizing said electromagnet coil.

5. Means as claimed in claim 4 in which said electric circuit means includes a damping impedance element serially connected in circuit with said electromagnet coil to prevent the build-up of oscillations in the electrical circuit.

6. Means as claimed in claim 2 in which said vane is mounted to provide a visible indication of its angular position.

7. Means as set forth in claim 6 in which said vane is enclosed within a cylinder of non-magnetic material having brightly-colored markings on part of its surface and at least part of the housing enclosing said cylinder being transparent.

8. Means as set forth in claim 1 including electrical contacts operated by movement of the spindle for controlling apparatus adapted to provide an electrical indication of its angular position.

9. Means as claimed in claim 1 in which said vane is a low hysteresis coefficient material.

10. Means as claimed in claim 2 in which said permanent magnet is a ceramic material.

11. Means for indicating the passage of a fault current along a conductor of an electric power line comprising a housing, a spindle rotatably supported within said housing, a vane of magnetic material secured to said spindle and rotatable therewith from a normal line current indicating position to a fault current indicating position, magnetic means for constraining said vane in each of said positions including a permanent magnet rigidly secured to said spindle and rotatable therewith and a magnetic circuit within said housing including at least one pole-piece adjacent to said permanent magnet in each of said positions of said vane, means for clamping said housing to the conductor at a selected position relative to said conductor such that the axis of said spindle is parallel to the axis of said conductor and said vane is constrained in the absence of a fault current in the line conductor in said normal line current indicating position, said vane being responsive to a fault current along the conductor to overcome the force of the permanent magnet constraining means and rotate from the normal line current indicating position to the fault current indicating position such that said vane is positioned perpendicular to an imaginary plane passing through the axis of the conductor and the axis of the spindle, and an electromagnet coil operably associated with said magnetic circuit and adapted to be energized to cause said permanent magnet to be rotated from the fault indicating position to the normal line current indicating position and electric circuit means for energizing said electromagnet coil, said electric circuit means including said conductor, two capacitors connected to be charged by the current flowing along said conductor and switching means connected for discharging one of said capacitors through said electromagnet coil when the potential across said one capacitor exceeds a predetermined value.

12. Means as claimed in claim 11 in which the other of said two capacitors comprises a pair of conductive plates, one of which comprises a portion of the inner surface of the housing.

References Cited

UNITED STATES PATENTS

| | | | |
|---|---|---|---|
| 606,449 | 6/1898 | Cutler | 335—276 |
| 3,210,750 | 10/1965 | Leonard | 340—253 |
| 3,138,742 | 6/1964 | Schweitzer | 324—127 X |
| 3,177,480 | 4/1965 | Sankey | 340—253 |
| 3,253,215 | 5/1966 | Moakler et al. | 340—253 |
| 3,300,776 | 1/1967 | Fitch et al. | 340—373 |

JOHN W. CALDWELL, *Primary Examiner.*

NEIL C. READ, THOMAS B. HABECKER, *Examiners.*

D. MYER, *Assistant Examiner.*